Oct. 28, 1924.
J. E. THURSTON
1,513,073
PISTON RING CLAMP AND FILE GUIDE
Filed May 7, 1923
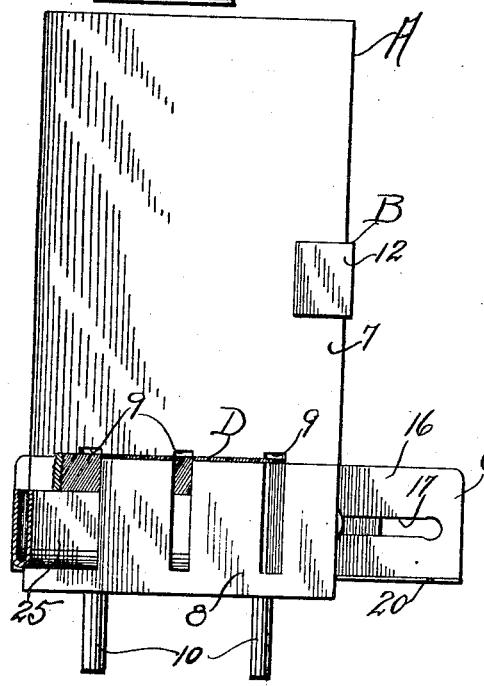
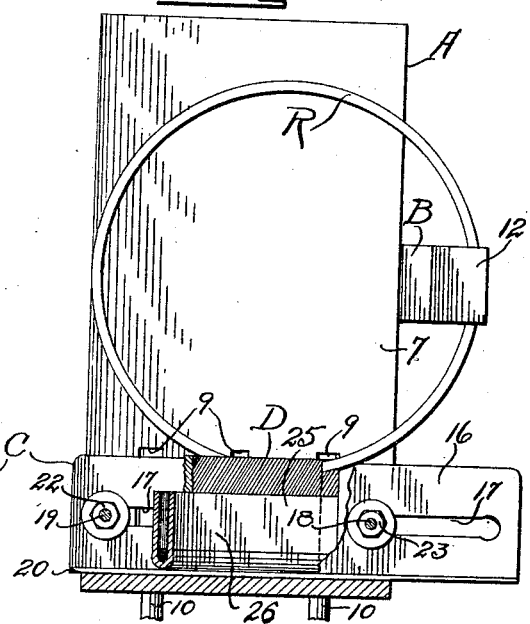
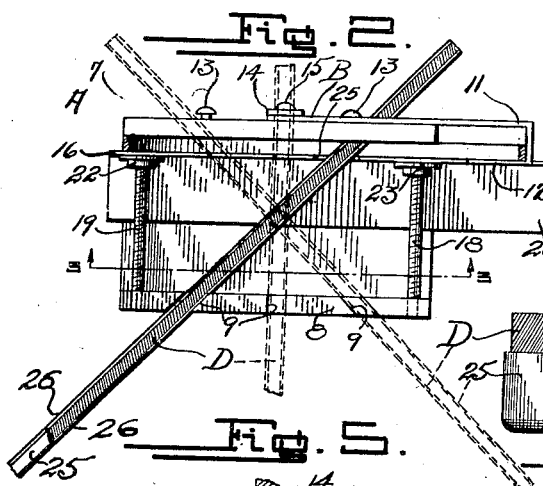
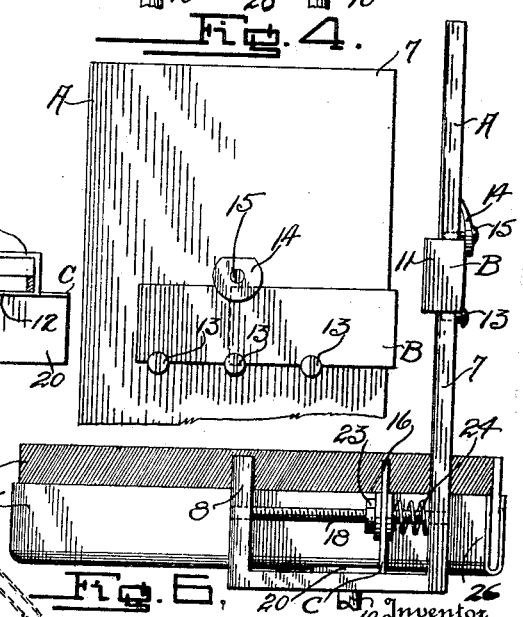
Inventor
John E. Thurston.

Patented Oct. 28, 1924.

1,513,073

UNITED STATES PATENT OFFICE.

JOHN E. THURSTON, OF HUBBARD, OREGON.

PISTON-RING CLAMP AND FILE GUIDE.

Application filed May 7, 1923. Serial No. 637,315.

*To all whom it may concern:*

Be it known that I, JOHN E. THURSTON, a citizen of the United States, residing at Hubbard, in the county of Marion and State of Oregon, have invented certain new and useful Improvements in a Piston-Ring Clamp and File Guide, of which the following is a specification.

The present invention relates to clamps for piston rings and is used especially when filing the rings to give proper clearance.

The primary object of the invention is the provision of a clamp for piston rings which may be used for holding the piston ring when filing the ends to either right or left miters or to a stop cut.

A further object of this invention is to provide a piston ring clamp which will be adjustable to accommodate piston rings of any diameter or width and having means to rigidly secure the clamp in a vise or similar device.

A still further object of the invention is the provision of a piston ring clamp which may be operated by the novice, one that is not likely to get out of order, is rugged and strong in construction, and otherwise highly desirable.

Other objects of the invention will appear in the following detailed description, taken in connection with the accompanying drawings, forming a part of this specification, and in which drawing:

Figure 1 is a front elevation of the clamp and guide, a portion of the file and guard being broken away.

Figure 2 is a top plan view of the clamp showing the ring in section and the cutting file in the three different possible positions.

Figure 3 is a section taken on line 3—3 of Figure 2, looking in the direction of the arrow and showing a piston ring in place, parts of the guide and clamp are broken away for clearness.

Figure 4 is a fragmentary back view of the clamp showing the tightening and sliding adjustable holders for the piston ring.

Figure 5 is a detail section of the holder tightening means.

Figure 6 is a side elevation of the piston ring clamp.

In the drawings, wherein similar characters refer to similar parts throughout the several views, A designates a body portion of the clamping device; B, a securing means carried by A; while C represents an adjustable guide and clamping means and D, an abrasive or filing member.

Referring first to the body portion A, such may be made of metal of channel cross section, with a high wall 7 and a low wall 8, having a plurality of coacting guide slots 9. Projecting lugs or analogous means 10 for gripping the device in a vise may be provided, to conveniently hold it while performing the filing operation. It is to be noticed that the guide slots are arranged in pairs. The central slots have straight sides and are used for filing stop ends of piston rings while the outside slots are angular and are used for filing the oblique ends.

Concerning the receiving means B, such may be carried approximately half way up the high wall 7. This support may also be made of metal rebent near one end to form a hook having a bight portion 11 and an end 12 as shown in Figure 3 and supported to slide laterally of the body portion A by headed pins, screws, or analogous means 13. After the ring R is in place in the clamp and receiving means B adjusted, the tightening clamp disc 14 is secured in clamping engagement with the main body portion of the securing means B.

The adjustable guide and clamp C is interposed between the walls 7 and 8 of body portion A and may have a wall 16 parallel thereto. Slots 17 provide free passage of screw threaded pins 18 and 19 and a base flange 20 acts as a support to relieve pins 18 and 19 of friction. A slot 21 allows free passage of file and guard D. To adjust the clamp C, nuts 22 and 23 provided on pins 18 and 19 respectively are either tightened or loosened and compression spring 24 functions to hold wall 16 spaced away from wall 7 of body portion A. The piston ring R is disposed between walls 16 and 7 and held by hand to prevent binding of the ends while filing.

Referring now to the abrasive or filing member D, such may be an ordinary flat file provided with an elongated guard 25 of U-shaped cross section, which extends preferably the full length of the file and the side walls 26 of which cover about two thirds of the sides of the file. This construction prevents wearing away of any portion of the piston ring clamp during operation.

Changes in details may be made without departing from the spirit or scope of my invention; but,

I claim:

1. A piston ring clamp and file guide comprising in combination a body portion having guide slots therein, ring securing means carried thereby, a guard slidable through the slots, and ring cutting means carried by the guard and passing through the guide slots in said body portion with the guard.

2. A piston ring clamp and file guide comprising in combination a body portion having straight and oblique guide slots therein, ring securing means carried thereby, a guard slidable through selected guide slots of said body portion, and ring cutting means carried by said guard and adapted to pass through the guide slots in said body portion with the guard.

3. A piston ring clamp and file guide comprising in combination a body portion having guide slots therein, adjustable clamps for securing the work in place carried thereby, a guard slidable through said guide slots and serving to protect the walls of the slots, and work cutting means carried by said guard and adapted to pass through the slots in said body portion with the guard and engage and cut the work carried thereby.

4. A piston ring clamp and file guide comprising in combination a body portion having spaced high and low walls with a plurality of cooperating guide slots therein, an adjustable work securing means carried by said high wall, a guard slidable through selected guide slots of said walls, work clamping means carried between said high and low walls and movable towards and away from the high wall, and work cutting means carried by said guard and passing through said slots with the guard.

5. A piston ring clamp and file guide comprising in combination a body portion having spaced high and low walls with a plurality of guide slots therein, an adjustable work securing means carried by said high wall, an adjustable file guiding and work clamping wall disposed between said high and said low wall and having horizontal slots in its end portion and an opening intermediate its length, screw threaded guide pins passing through said slots in the end portions of the guide, adjusting nuts carried by the screw threaded guide pins for moving the guide towards the high wall, a compression spring for each pin coiled thereabout and interposed between the clamping wall and said high wall and yieldably resisting movement of the guide upon said nuts, and a file carrying guard extending through the intermediate opening of said guide and through selected openings of said walls.

6. A piston ring clamp and file guide comprising in combination a body portion of channel cross section having one high and one low wall with a plurality of cooperating guide slots therein, an adjustable work securing means carried by said high wall, an adjustable file guiding and work clamping wall interposed between the walls and having horizontal slots in its end portions and intermediate its length, screw threaded guide pins passing through the slots of said guiding wall, adjusting nuts carried by the screw threaded guide pins for imparting movement to the guiding wall, a compression spring for each pin coiled thereabout and interposed between the clamping wall and said high wall for yieldably resisting movement thereof by said nuts, a file carrying guard extending through the intermediate openings of said guide wall and through selected slots of said body portion, and depending projections rigid with the body portion.

JOHN E. THURSTON.